United States Patent [19]
Chang

[11] Patent Number: 5,702,184
[45] Date of Patent: Dec. 30, 1997

[54] DEVICE FOR THERMALLY TESTING A TEMPERATURE CONTROL ELEMENT

[76] Inventor: Su-Fen Chang, P.O. Box 90, Tainan, 704, Taiwan

[21] Appl. No.: 677,388

[22] Filed: Jul. 9, 1996

[51] Int. Cl.$^6$ .................................................. G01K 15/00
[52] U.S. Cl. .................................. 374/1; 73/865.6
[58] Field of Search ................... 374/1, 57, 208; 73/865.6

[56] References Cited

U.S. PATENT DOCUMENTS

| | | | |
|---|---|---|---|
| 2,406,080 | 8/1946 | Laird | 374/1 |
| 4,479,726 | 10/1984 | Townsend | 374/1 |
| 4,854,726 | 8/1989 | Lesley et al. | 374/57 |
| 5,118,945 | 6/1992 | Winschuh et al. | 374/57 |
| 5,269,370 | 12/1993 | Christian et al. | 374/57 |

FOREIGN PATENT DOCUMENTS

| | | | |
|---|---|---|---|
| 0747133 | 9/1944 | Germany | 374/1 |
| 0114566 | 9/1979 | Japan | 374/1 |
| 405066161 | 3/1993 | Japan | 374/1 |
| 0964782 | 10/1982 | U.S.S.R. | 374/1 |

*Primary Examiner*—Diego F. F. Gutierrez

[57] ABSTRACT

A temperature control element testing device includes a table provided with an inner hollow in which is situated a testing plate for placing one or more temperature control elements for testing, a heater, a heat conductive plate directly heated by the heater, a lower case for containing a heat transmitting fluid which receives heat from the heat conductive plate and transmits the heat to the testing plate, the heat thereby being transmitted to the testing plate only indirectly via the heat conductive plate and heat transmitting fluid to provide more even heating of the temperature control elements being tested. Signal lamps are used to show the highest and lowest temperature of the elements being tested.

5 Claims, 6 Drawing Sheets

DEVICE FOR THERMALLY TESTING A TEMPERATURE CONTROL ELEMENT

BACKGROUND OF THE INVENTION

This invention concerns a temperature control element testing device, and particularly a temperature control element contained in an inner hollow of a table and having a heat conductive plate, a heat transmitting fluid, and a testing plate on which a temperature control element(s) is placed for testing to be heated up in an even and balanced manner so as to accurately and quickly perform testing work.

Finished temperature control elements generally have to be tested to see whether they are heat sensitive, reliable, and safe. So far, sufficiently accurate testing devices for temperature control elements are not available and, therefore, a large number of temperature control elements are put on the market without effective testing, potentially endangering consumer's lives and property.

A most common testing method uses a table with an electric heater and a testing device for indicating the amount of heat added to the temperature control elements. However because a heater itself produces heat in a non-balanced condition, and the heat is therefore uneven or unbalanced when it reaches the temperature control elements placed on the surface of the table, the elements cannot be accurately tested. In addition, the number of elements to be tested at one time can at most be only twenty or so.

SUMMARY OF THE INVENTION

An objective of the invention is therefore to offer a testing device for temperature control elements which can test them under even and balanced controllable temperature conditions so as to obtain an accurate result.

The main feature of the invention is a testing device including, in order from bottom to top, a heater, a heat conductive plate on the heater, a lower case having an inner hollow and deposited on the heat conductive plate, a heat transmitting fluid contained in the inner hollow and put on the lower case, a testing plate for placing temperature control element(s) thereon, the testing plate being put in the upper case and having its bottom immersed in the heat transmitting fluid for heat characteristics testing, and an upper lid for closing the upper case.

Another feature of the invention is a signal lamp section provided on an operation panel, and signal lamps fixed on the signal lamp section that can be lit up or turned off to indicate whether the temperature control element(s) undergoing testing reaches the highest temperature preset for it or not.

BRIEF DESCRIPTION OF THE DRAWINGS

This invention will be better understood by reference to the accompanying drawings, wherein.

DETAILED DESCRIPTION OF THE PREFERRED EMBODIMENT

Figure 1:
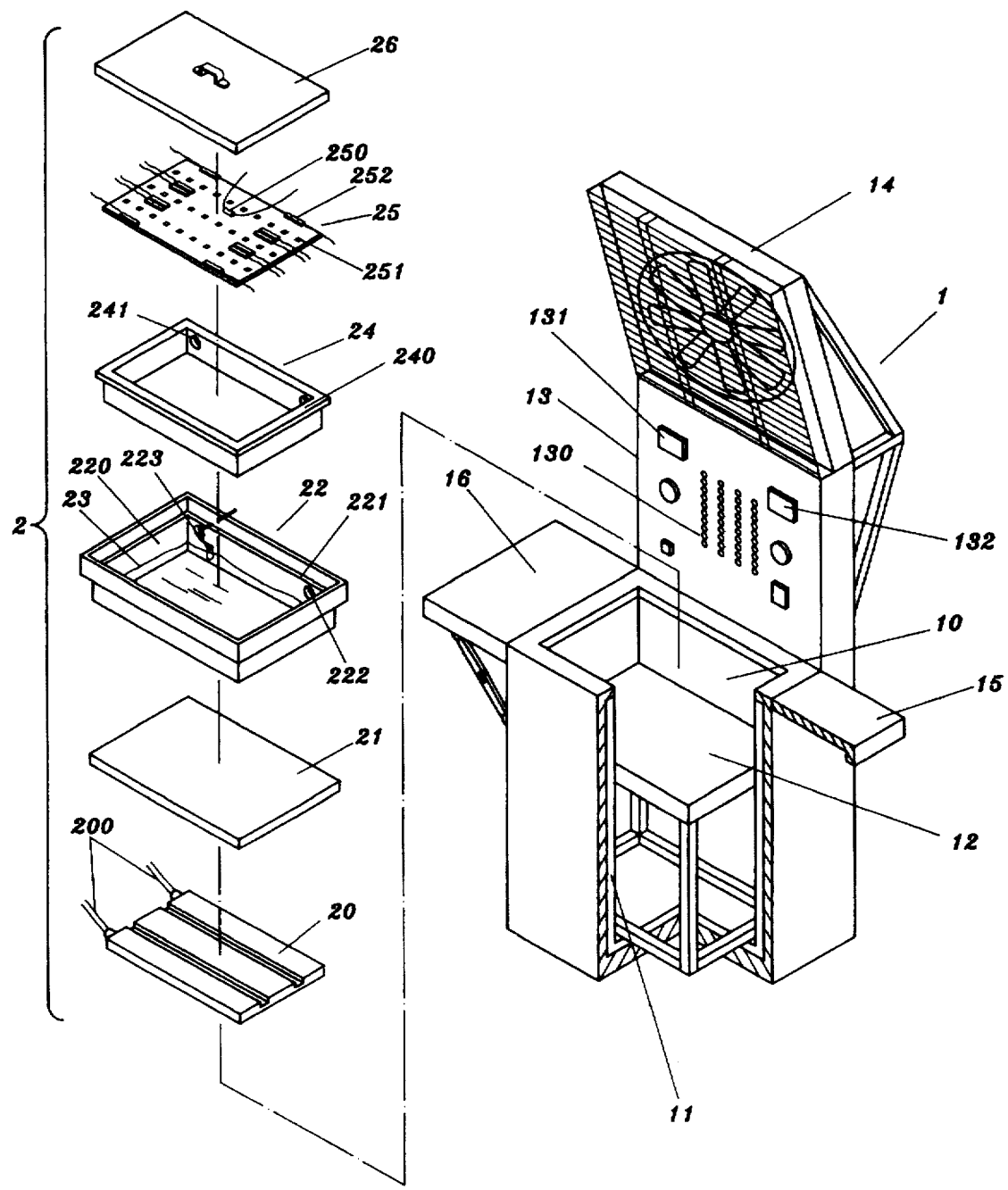
FIG. 1 is an exploded perspective view of a temperature control element testing device according to the present invention.
Figure 2:
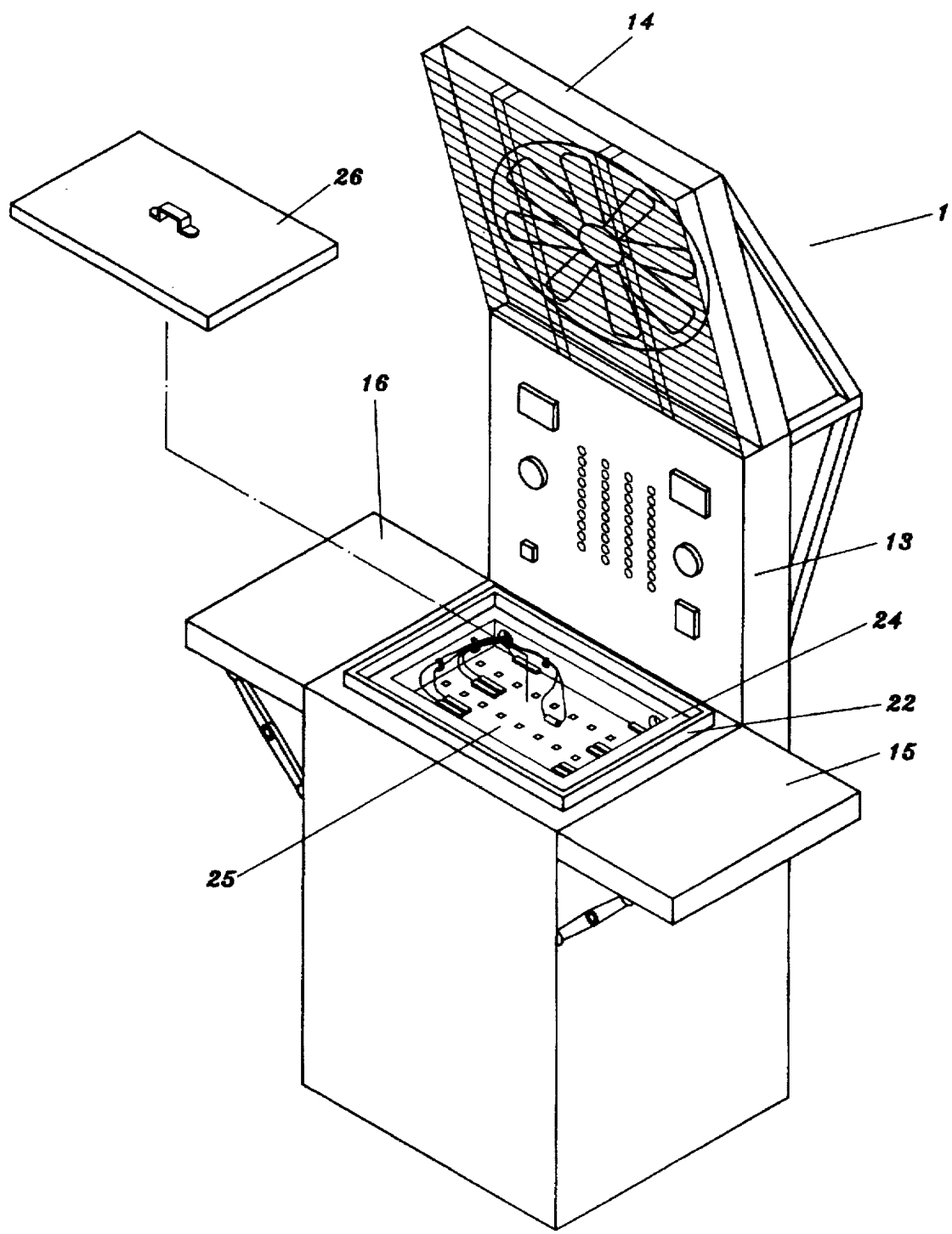
FIG. 2 is a perspective view of the temperature control element testing device of the present invention.

A preferred embodiment of the present invention, as shown in FIG. 2, includes a table 1 and a testing device 2 combined together.

The table 1 has an inner hollow 10 surrounded by a bottom wall, four side walls and an open upper side, a layer of heat-preserving cotton 11 fixed on the bottom wall and the four side walls, an intermediate flat plate 12 supported by a frame in the inner hollow 10, a vertical rear operating panel 13 standing up from the rear side wall, a signal lamp section 130 and two temperature control switches 131, 132 provided on the front surface of the operation panel 13, a cooler 14 fixed on the operation panel 13 and facing at an angle toward inner hollow 10 for cooling the testing device 2 and two foldable plates 15, 16 respectively foldable relative to two opposite sides of the open upper side of the table 1.

The testing device 2 is contained in the inner hollow 10 of the table 1, and includes an electric heater 20 placed on the intermediate flat plate 12, a heat conductive plate 21 placed on the heater 20, a lower case 22 having an open upper side and placed on the plate 21, a heat transmitting fluid 23 contained in the lower case 22, an upper case 24 placed on the outer case 22, a testing plate 25 placed in the upper case 24, and an upper lid 26 closed on the upper case 24.

The heat transmitting plate 21 is made of a metal such as aluminum, copper, iron, etc. made of a high heat transmitting material.

The lower case 22 is also made of a good heat transmitting metal, and has its bottom surface in contract with an upper surface of the heat conductive plate 21. Lower case 22 includes an inner hollow 220 surrounded by the bottom wall and four lower side walls, four short upper side walls 221 extending up from upper edges of the four lower side walls, wire holes 222 bored in one lower side wall, and a temperature controller 223 fixed on an inner surface of one lower side wall.

The heat transmitting fluid 23 is contained in the inner hollow 220 of the lower case 22, and preferably is non-toxic, odorless and non-flammable, and has good heat stability, good oxidizing stability, high durability and heat transmitting characteristics. Examples include kerosene oil and silicon oil.

The upper case 24 is made of a good heat transmitting metal, and is fitted on the upper side walls of the lower case 22 in the inner hollow 220. Upper case 24 preferably has an open upper side, an open bottom side, four projecting sidewise edges 240 extending sidewise from upper ends of the four side walls of the upper case 24, and wire holes 241 in one side wall corresponding to the wire holes 222 of the lower case 22.

The testing plate 25 is welded to lower ends of four side walls of the upper case 24 and includes a temperature controller 250, plural clips 251, and plural conductive sockets 252 on an upper surface.

The upper lid 26 engages the four projecting sidewise edges 240 of the upper case 24 upon closure.

Figure 3:
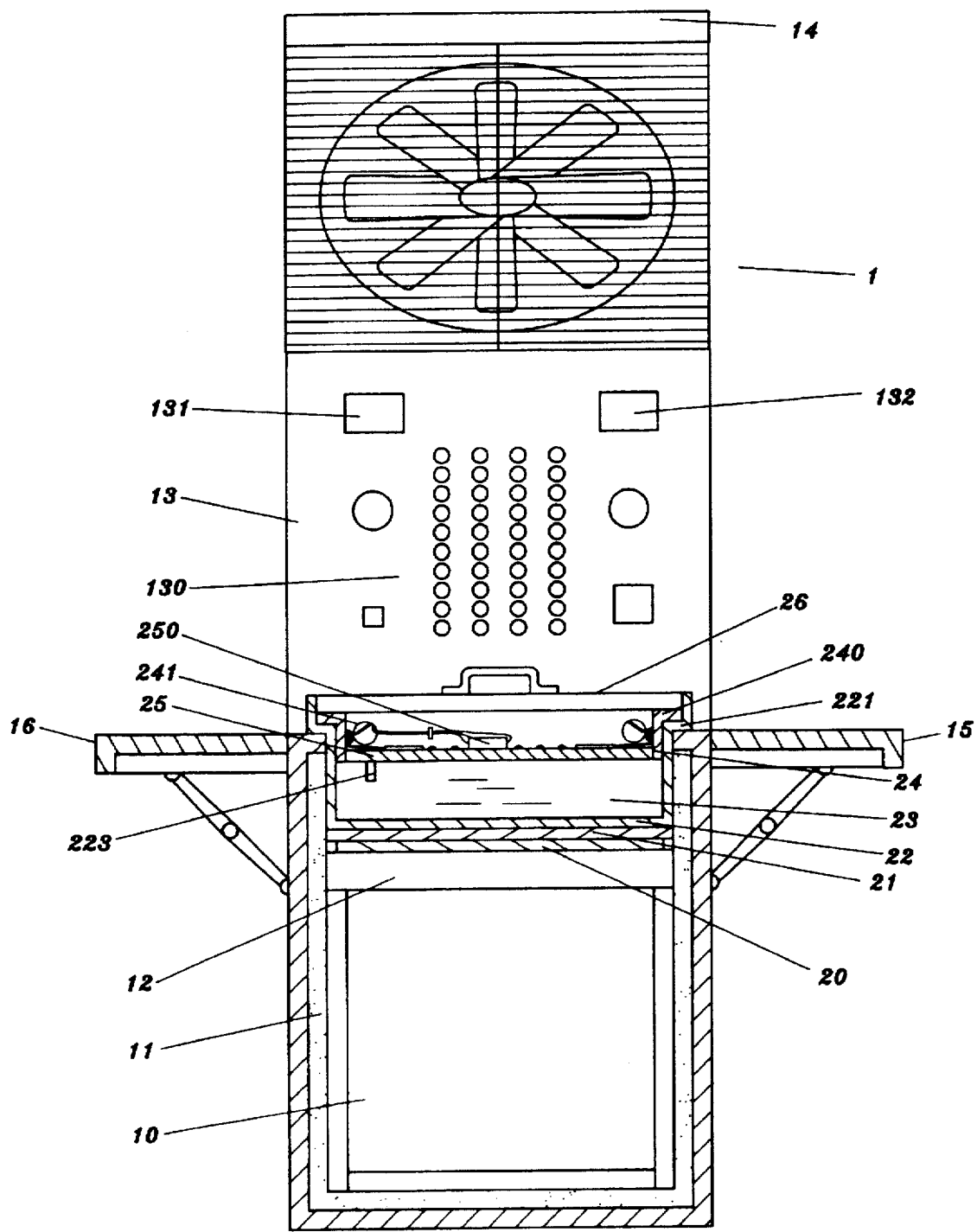
FIG. 3 is a cross-sectional view of the temperature control element testing device of the present invention.
Figure 4:
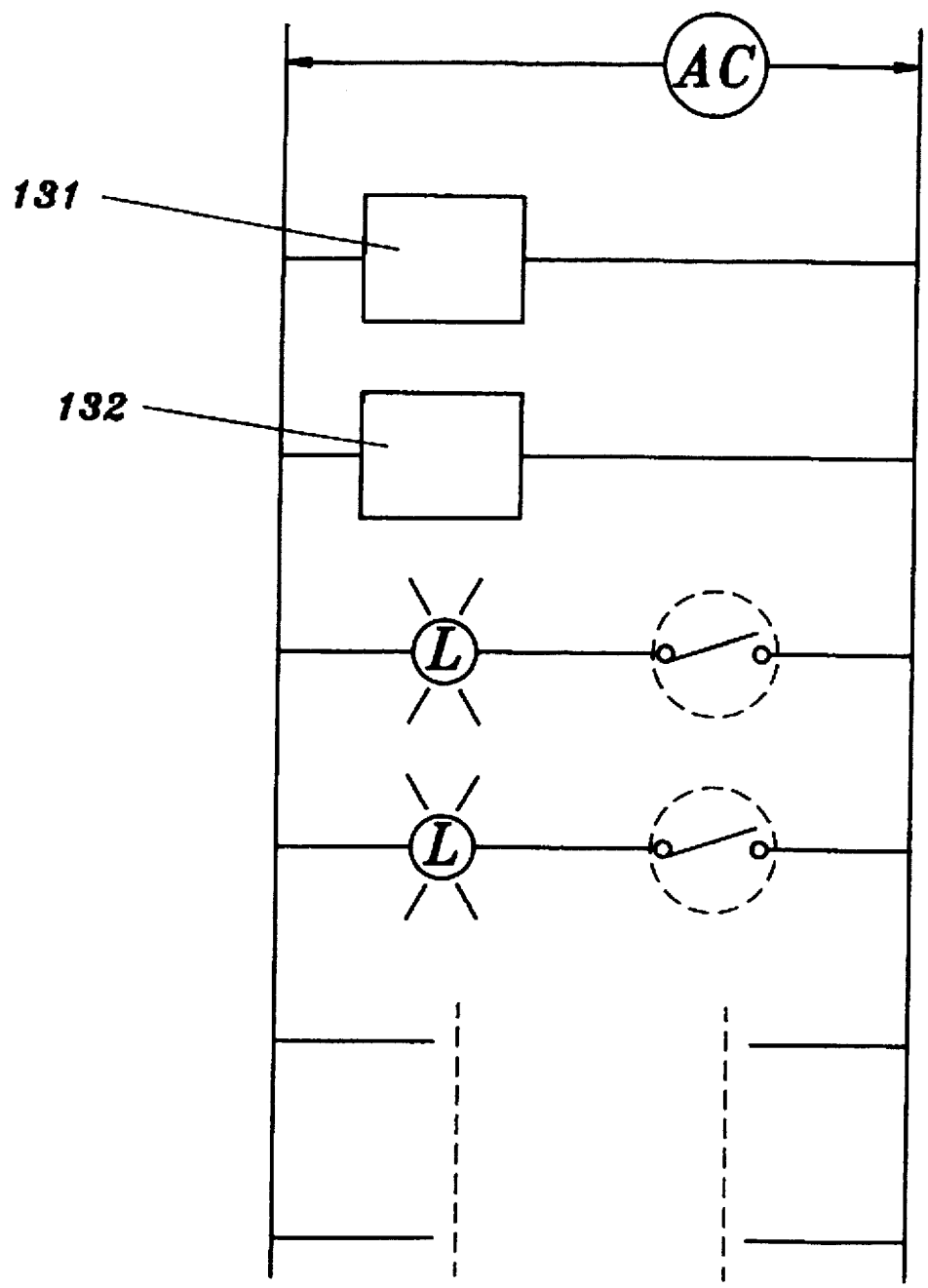
FIG. 4 is a flow chart of a circuit for the temperature control element testing device of the present invention.

To assemble the testing device referring to FIGS. 2, 3, and 4, the heater 20 is first placed on the intermediate plate 12 in the inner hollow 10 of the table 1, with high-heat-resistant wires 200 such as glass-fiber insulated wire, silicon gel insulated wire, teflon insulated wire, etc. connected between the heater 20 and the power switch. Then the heat conductive plate 21 is fixed on the heater 20, and the bottom of the lower case 22 is placed directly on and contacts the upper surface of the heat conductive plate 21, with the upper side walls 221 fitting around the mouth of the inner hollow 10 of the table 1. After that, the heat transmitting fluid 23 is poured in the inner hollow 220 of the lower case 22, and the upper case 24 fitted around the four upper side walls 221 of the outer case 22 and located on the inner hollow 220. Now, the testing plate 25 is welded with lower ends of four side walls of the upper case so as to immerse the bottom of the testing plate 25 in the heat transmitting fluid 23, with the four projecting sidewise edges 240 of the upper case 24 supported by the four upper side walls 221 of the lower case 22, and with the wire holes 241 facing the wire holes 222 of the lower case 22. Then the upper lid 26 is closed on the four projecting sidewise edges 240 of the inner case 24. The high-heat-resistant wires of the temperature controllers 250, 223, which may be P.I.D. temperature controllers of the tape used for micro computers and which are situated in the inner hollow 220 of the lower case 232, are laid through the wire holes 241, 222 of the upper case 24 and the lower case 22 and respectively connected with the temperature control switches 131 and 132 deposited on the operation panel 13. As a result, the controllers provide an accurate temperature comparison value, and the highest and lowest limit of temperature preset may be adjusted. In addition, a temperature protective device is provided in the table to prevent accidents resulting from too high a temperature. The conductive socket 252 is connected with the signal lamp section 130 of the operation panel 10 via high-heat-resistant wires laid through the holes 242 and 222 of the lower and the upper case 22 and 24 so that a single lamp may be lit up when a temperature control element A is connected with the conductive socket 252 for testing.

Figure 5:
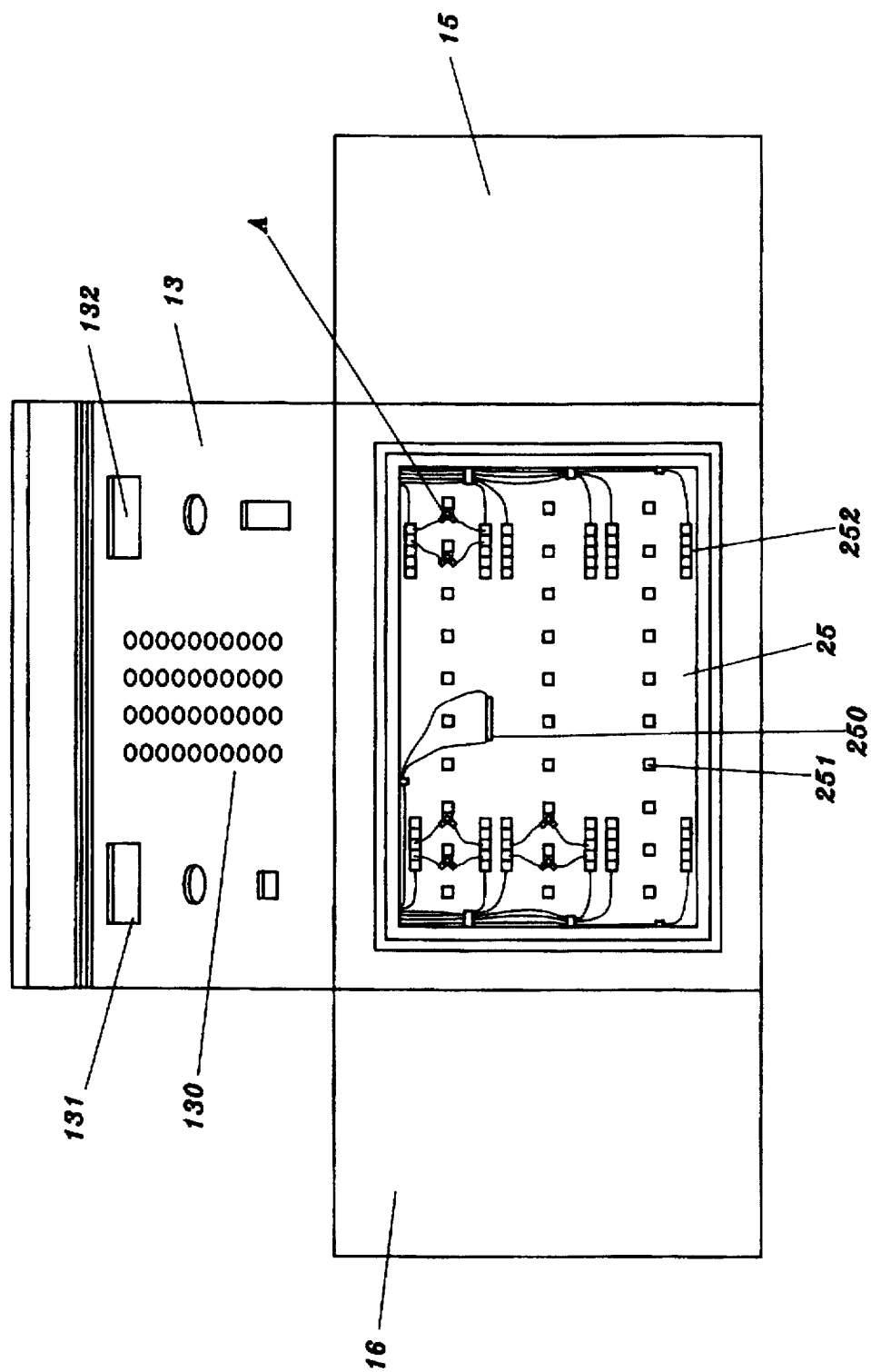
FIG. 5 is an upper view of the temperature control element testing device of the present invention, showing it under testing conditions.
Figure 7:
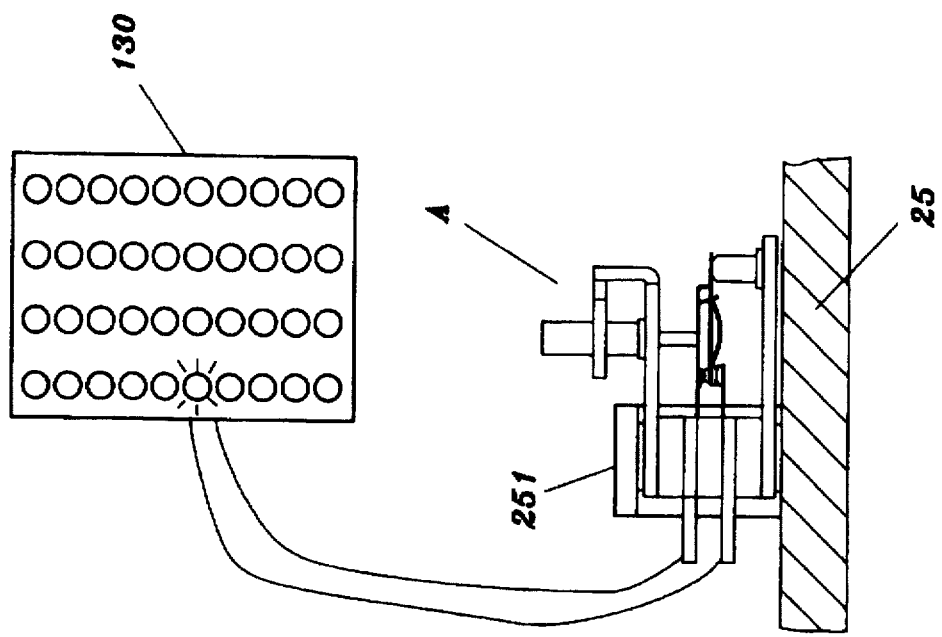
Figure 6:
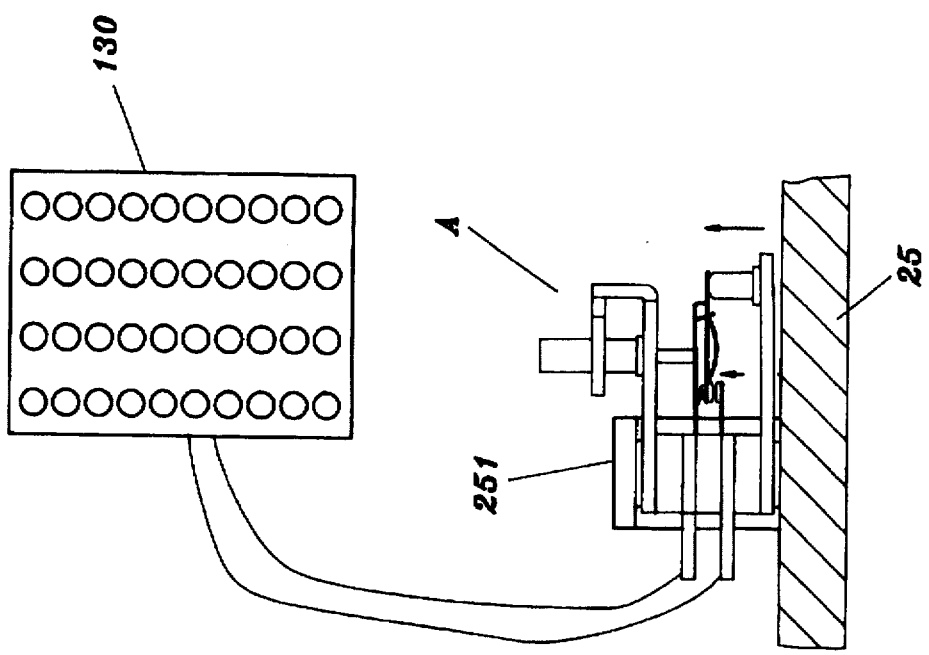
FIG. 6 is a side view of a temperature control element (a two-metal temperature controller) placed on a testing plate for the temperature control element testing device of the present invention, with no signal lamp lit up to indicate that the element is heated up to the testing temperature; and, FIG. 7 is a side view of the temperature control element (the two metal temperature controller) placed on the testing plate of the temperature control element testing device of the present invention, with a signal lamp lit up to indicate that the element is being heated but is not yet heated up to the preset highest temperature.

In operation, a temperature control element such as a two-metal temperature switch used in an herb boiling pot and a hot water dispenser, or a magnetic spring temperature switch used in an electric rice cooker, is placed on the testing plate 25, with the clips 251 catching hold of it, and with the heat-resistant wires of the element connected with the conductive socket 252 as shown in FIG. 5. Then the heater 20 is electrified, and the heat transmitting plate 21 transmits heat to the heat transmitting fluid 23 in the inner hollow 220 of the lower case 22, without directly heating up the lower case 22 lest the fluid 23 should undergo chemical change owing to instant overheat, altering its characteristics. The fluid 23 transmits heat in an even and balanced manner to the upper case 24 in contacts therewith and the testing plate 25. If the upper lid 26 is closed on the testing plate 25 and the upper case 24, the temperature control element A will activate the signal lamp to turn off when the element A reaches the preset highest temperature as shown in FIG. 6. If the temperature of the element A goes down or does not reach the preset highest temperature preset, it will activate the signal lamp to light up as shown in as shown in FIG. 7. Then the highest limit of the element A is good, but when the difference is outside the preset range, the element A is bad.

The temperature control switches 131 and 132 are used to adjust the highest and the lowest temperature limits for different temperature control elements. Further, the cooler 14 can be used to cool temperature control element(s) that have just completed testing, speeding up the testing process and saving time in testing work. And the foldable plates 15 and 16 can be used for temporarily setting aside temperature control elements for convenience during testing.

The present invention will be understood to have the following advantages, as can be seen from the above description.

1. The cotton layer 11 provided around the inner hollow 10 can preserve heat from the heater 20 without dispersing out of the inner hollow 10, enabling accurate testing of temperature control elements.

2. The heat transmitting fluid 23 does not undergo chemical change caused by instant overheat and thus does not alter its characteristics so that accuracy of testing may be kept, because the heat conductive plate 21 is located between the heater 20 and the lower case 22, with the lower case 22 not being directly heated by the heater 20.

3. Heat energy can be transmitted to the testing plate 25 from the heat transmitting fluid 23 in an even and balanced condition, and thus accurate testing for many temperature control elements at one time can be performed.

4. High-heat-resistant wires are used for connecting the heater 20, the conductive socket 252, and the temperature controllers 223, 250, so there is no anxiety of burning of the wires.

5. The cooler 14 provided above the table can quickly cool down tested temperature control elements still in a hot condition, effectively speeding up testing.

While the preferred embodiment of the invention has been described above, it will be recognized and understood that various modifications may be made therein and the appended claims are intended to cover all such modifications which may fall within the spirit and scope of the invention.

What is claimed is:

1. A temperature control element testing assembly comprising:

a table having an open upper side and an inner hollow surrounded by a bottom wall and four side walls;

a testing device situated in said inner hollow of said table, the testing device including:

a heater having a flat shape;

a heat conductive plate placed on said heater;

a lower case having an open upper side, a bottom wall and four side walls, and an inner hollow defined by said bottom wall and said four side walls, said bottom wall of said lower case contacting an upper surface of said heat conductive plate;

a heat transmitting fluid contained in said inner hollow of said lower case;

an upper case having an open upper side, an open bottom side, and four side walls, said upper case being placed on an upper section of said lower case;

a testing plate having a flat shape, said testing plate being welded to lower ends of said four side walls of said lower case, wherein a bottom of said testing plate is immersed in said heat transmitting fluid; and an upper lid for closing said open upper side of said upper case; and, wherein said heater is arranged heated to be heated by electricity, said heat conductive plate is heated by said heater and transmits heat in an even and balanced manner to said heat transmitting fluid contained in said lower case, and said heat transmitting fluid transmits heat in an even and balanced manner to said testing plate, so that at least one temperature control element located on said testing plate is heated to a preset lowest limit and highest limit of temperature so as to the test temperature control characteristics of said temperature control element in an accurate and speedy way.

2. The temperature control element testing assembly as claimed in claim 1, further comprising a layer of cotton provided on inner surfaces of said four side walls and said bottom wall of said inner hollow of said table for preserving heat inside said inner hollow of said table, an intermediate flat plate with frames in said inner hollow of said table, an operating panel extending upwardly from one of said side walls of said inner hollow of said table, said operating panel having a signal lamp section including plural signal lamps and temperature control switches, a cooler extending from said operating panel and inclined forward to face said inner hollow of said table, and flat foldable plates respectively provided on two opposite sides of a mouth of said inner hollow of said table.

3. The temperature control element testing assembly as claimed in claim 1, wherein said inner hollow of said lower case and said testing plate further include a temperature controller connected with said table.

4. The temperature control element testing assembly as claimed in claim 1, wherein said lower case further has four upper side walls extending up from upper ends of said four side walls surrounding said inner hollow of said lower case, one of said four side walls of said lower case has wire holes, said upper case has four edges projecting laterally from upper ends of said four side walls of said upper case, one of said four side walls of said upper case has wire holes, and said wire holes of said upper case coincide with said wire holes of said lower case when said four edges of said upper case are positioned between said four upper side walls of said lower case.

5. The temperature control element testing assembly as claimed in claim 1, wherein said testing plate further includes a plurality of clips and a plurality of conductive sockets on an upper surface of said testing plate for respectively holding said at least one temperature control element and electrically connecting said at least one temperature control element to and operating panel.

* * * * *